No. 617,416. Patented Jan. 10, 1899.
W. R. ELLIS.
EGG BEATER.
(Application filed Apr. 3, 1895. Renewed June 14, 1898.)
(No Model.)
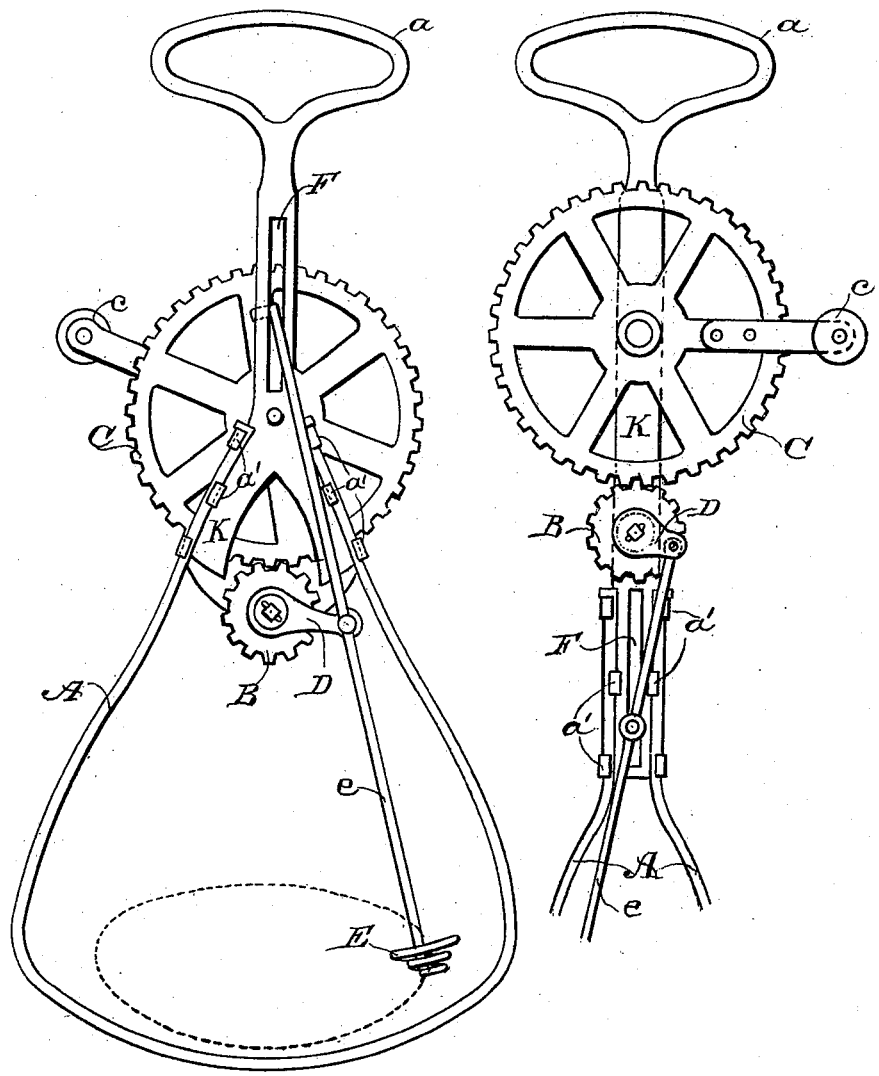

UNITED STATES PATENT OFFICE.

WILSON R. ELLIS, OF WOODLAND, CALIFORNIA.

EGG-BEATER.

SPECIFICATION forming part of Letters Patent No. 617,416, dated January 10, 1899.

Application filed April 3, 1895. Renewed June 14, 1898. Serial No. 683,440. (No model.)

*To all whom it may concern:*

Be it known that I, WILSON R. ELLIS, a citizen of the United States, residing at Woodland, Yolo county, State of California, have invented an Improvement in Egg-Beaters; and I hereby declare the following to be a full, clear, and exact description of the same.

My invention relates to improvements in egg-beaters, and has especial reference to that class of egg-beaters having a dasher-arm the free end of which moves in an elongated elliptical path; and the object of my invention is to provide a support for an egg-beater of this character adapted to rest upon the bottom of a bowl or vessel and so conformed relatively to the elliptical path of the beater that the free end of the dasher on one stroke thereof shall be close to the bottom of the vessel, a support which will act as a guard to prevent the dasher-arm striking the bottom or sides of the vessel, and one such that no part of the mechanism or gearing for operating the beater or the bearings for said mechanism shall come into contact with the liquid being beaten; and a further object of my invention has been to provide an egg-beater of this class with which the strokes of the dasher may be made with great rapidity and yet the device easily held in place.

In the accompanying drawings, Figure 1 is a side elevation of the egg-beater, and Fig. 2 is a similar view showing a modified form of gearing therein.

K is a casting having a handle a, by which the device can be held firmly on the bowl or vessel. Mounted in bearings on said casting K are the large wheel C and the pinion B, gearing therewith, the latter carrying a crank D, at the end of which is secured a rod e, having a dasher E, the upper end of said rod sliding in a slot F in the casting. The dasher E will, as is readily seen, describe an ellipse, and the motion of said dasher thus very closely resembles the motion used in whipping or beating eggs by hand. This motion is far more effective and desirable than a simple circular or reciprocating motion.

In order to permit of the beater being used in connection with any suitable bowl or vessel, I provide a bail-like wire support A, secured to the casting K by the lugs a'. The lower side of this wire support is so conformed that the dasher E in the lower side of the elliptical path it describes passes close to said lower side of the support. Thus when the support rests upon the bottom of a vessel the dasher E moves close to the bottom of the vessel, and so most effectually whips or beats the eggs. At the same time the support A acts as a guard, preventing the dasher striking the bottom of the vessel at the middle of its path or the sides of the vessel at the ends of its path. It will further be seen that the support is connected to the egg-beater at a point out of contact with the material being whipped or beaten. Thus it is very easily kept clean.

In the construction shown in Fig. 2 the slot F is placed below the gearing. The path of the dasher will then be of the form of a half-moon or concavo-convex.

Having thus fully described my invention, I claim—

1. In an egg-beater, the combination with a frame, a dasher-rod, a dasher, and mechanism supported by the frame for communicating a rapid vibratory motion to said dasher-rod, of a support adapted to rest in the bottom of a bowl or vessel containing the material to be beaten, secured at its upper portion only to said frame, and extending downward and below the vibratory path of the dasher and in close proximity to the lowest point of said path, the portion of said support underlying said path being made thin in its vertical dimension, whereby, when said portion is placed on the bottom of such bowl or vessel, the vibratory path of the dasher shall, at its lowest point, be close to the supporting-surface of said vessel, substantially as described.

2. The combination, with a frame, a dasher-rod, and mechanism supported by the frame for communicating a rapid vibratory motion to the dasher-rod, of an inverted-bail-like support or wire extending around or outside the limiting positions of the dasher-rod and below the same and secured to the frame at its ends only, the intermediate position being free, substantially as described.

3. The combination, with a frame, a dasher-rod, and mechanism supported by the frame for communicating an elliptical motion to the end of the dasher-rod, of an inverted-bail-like support or wire extending in front and to the rear of the limiting positions of the dasher-rod, the central portion of the wire being conformed to the lower side of the elliptical path of the dasher, said wire being secured to the frame at its upper ends only, substantially as described.

4. The combination of a frame, large and small gear-wheels mounted thereon, a crank on the small gear-wheel, a dasher-rod secured on the end of the crank, means for restricting the movement of the upper end of the dasher-arm to a direction substantially in line with the centers of the gear-wheels, a handle for the frame also in line with the center of the gear-wheels and a support secured at its upper ends only to the frame and extending downward and below and around the dasher-arm, substantially as described.

In witness whereof I have hereunto set my hand.

WILSON R. ELLIS.

Witnesses:
S. H. NOURSE,
H. F. ASCHECK.